Aug. 28, 1962     A. H. FROHLICH ETAL     3,051,225

TIRE BUFFING MACHINE

Filed April 22, 1957

INVENTORS
ADOLF H. FRÖHLICH &
EDWARD J. HARRIS

BY

ATTORNEY

United States Patent Office 3,051,225
Patented Aug. 28, 1962

3,051,225
TIRE BUFFING MACHINE
Adolf H. Frohlich and Edward J. Harris, Akron, Ohio, assignors to The Cleveland Trust Company, Cleveland, Ohio, as trustee
Filed Apr. 22, 1957, Ser. No. 654,103
3 Claims. (Cl. 157—13)

This invention relates to the art of retreading pneumatic tires, and in particular, has reference to improvements in buffing equipment that is used to prepare the exterior surface of a used tire carcass for a recapping operation.

In the known prior art of buffing pneumatic tires prior to recapping, it has long been known that the exteroir crown surface of the used carcass must be buffed to remove excess tread stock that is present on same. In present devices, this buffing operation is normally confined to the exterior crown region of the tire, due to the fact that recapped tires, at the present time, are normally provided with new tread stock only in the crown region, thereof.

However, with the development of certain newly introduced retreading procedures wherein the exterior surface of the worn carcass is covered from bead-to-bead, it has been found necessary that the sidewall portion of the tire be buffed as well as the crown region to which the tread is normally applied.

At the present time, it has not been possible to utilize known prior art for this purpose in view of the fact that the same are incapable of being shifted through a path of movement that permits the sidewall, as well as the tread portion of the tire, to be buffed.

As an additional disadvantage in the known prior art, it has been found that the revolving brush normally employed therein, is incapable of adjustment radially of the tire with the result that the machine in this present day prior art is normally limited to use for one size tire only. As a result of this confined adjustment, it is difficult and expensive to adjust the machine for use on additional sizes of tires.

In co-pending application, Serial No. 593,464, filed June 25, 1956, by Adolf Frohlich and Edward J. Harris, now U.S. Patent No. 2,939,520, there is disclosed an improved type of buffing machine that obviates the aforementioned difficulties with the known types of prior art.

In general, this machine operated on the principle that a revolving brush was oscillated about the axis of the rotating tire and with the oscillation of the brush serving to keep the revolving brush in contact with the crown region of the tire, so that the tread stock thereof could be removed.

While the above type buffing machine has been satisfactory, it has been found that improved results could be obtained by utilizing certain improvements thereto. For example, in the device disclosed in the aforementioned co-pending application, there was a fixed depth of penetration determined as a result of the position of a roller against a cam plate. This, in effect, required that the buffing unit remove all tread stock in one period of oscillation, with the result being that this arrangement caused the creation of unequal pressures during the tread removing operation so that difficulty would be encountered, for example, when a "low spot" was encountered.

It has been found that the aforementioned difficulty can be obviated by progressively advancing the buffing wheel towards the axis of rotation of the tire step-by-step, with this progressive advancement being timed to the oscillation cycle that the buffing wheel moves through. In this manner, each oscillatory movement of the frame results in the small amount of tread stock being removed, at which time, the device will be automatically indexed, so as to increase the degree of penetration with respect to the axis of rotation of the tire with the result that the next oscillatory movement will result in additional tread stock being removed. In this manner, a progressive removal is effectuated of the tread stock with the result that equal pressures are maintained at all times to avoid the creation of unequal pressures.

As a further improvement over the device set forth in the above referred-to copending application, it has been found that the effective overall buffing range of this machine can be increased greatly by making the cam plate thereof in sections, and further, by making these sections adjustable relatively of each other so that the effective width of the oscillatory stroke can be varied to thus accommodate different widths of tires. Thus, for example, a 600:16 tire can be buffed in one operation and this can be immediately followed by the buffing of an 800:16 tire by merely widening the effective width of the cam plate.

It has also been discovered that improved operating conditions can be obtained by having the adjustment feature of the aforementioned cam plate operated and controlled by a calibrated dial setting that is positioned so as to be accessible to the user of the machine.

As a still further improvement over the aforementioned co-pending application, it has been found that by offsetting the driving rolls that contact the tire so that the same do not back up the buffing rasp, improved results will be obtained. Also, in this regard, it has been found that providing a rasp of a contoured configuration, that improved results will be obtained by increasing the uniformity of the buffing operation.

An improved buffing machine utilizing the aforementioned improvements has been set forth in co-pending application, Serial No. 620,411, filed November 5, 1956, by Adolf Frohlich and Edward J. Harris, and now U.S. Patent No. 2,979,123.

While the above referred to buffing disclosed the use of a split type of cam to guide the buffing wheel during the oscillatory movement thereof, it has been found that it is necessary on certain occasions to vary the buffing contour to suit a particular shape of tire. Thus, while the above referred-to co-pending application could handle the buffing of various standard sizes of pneumatic tires, it is manifest that in each case, the contour buffed would be approximately the same in the sidewall region with the change, in each case occurring merely in the length of the central portion which would correspond to the region occupied by the tread stock of the tire being buffed. It has been discovered that if the split type of cam arrangement referred to in the above discussed co-pending application is further provided with one or more pairs of angularly adjustable wing members, adjacent certain edge surfaces, thereof, that even greater improvements can be achieved with respect to the overall buffing arrangement due to the fact that all sizes and shapes of tires can be accurately buffed by merely adjusting these wing portions to the proper setting necessary to control the path of movement of the oscillating cam member.

It accordingly becomes a principal object of this invention to provide an improved type of guide cam for a buffing machine that is capable of being set in an infinite number of positions so as to permit buffing to any desired contour.

It is a still further object of this invention to provide an improved type of buffing machine having means provided thereon, wherein a tire of any desired configuration can be buffed to the exact contour required.

These and other objects of the invention will become more apparent upon a reading of the following brief specification and considered in the light of the accompanying drawings.

Figure 1:
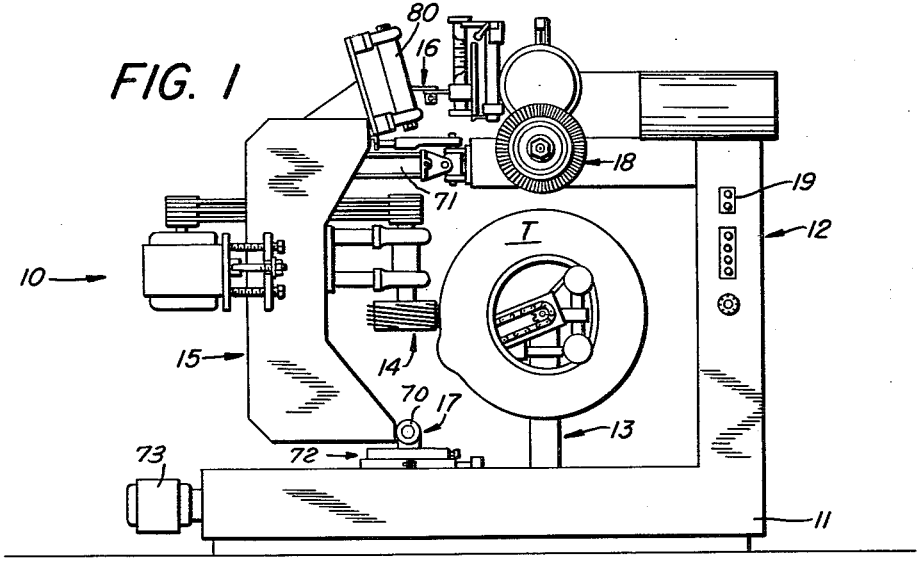
FIGURE 1 is a schematic view illustrating the improved cam on a buffing machine.

Referring now to the drawings, and in particular to FIGURE 1 thereof, the improved buffing machine, generally designated by the numeral 10, is shown including a base 11, that defines at one end thereof, an upright frame 12, and further includes support means 13 that rotatably support thereon a tire T, so that the same may have the tread stock thereof removed by a buffer 14; the arrangement being such that the buffer 14 is carried by an oscillating frame member 15, so that the depth of penetration thereof during oscillation of the frame member is controlled by cam means 16 that operate to vary the spacing between the free ends of the frames 12 and 15, with indexing of the cam 16 and buffer 14 being initiated by contact between the oscillating frame 15 and the switch means 17. The oscillating frame 15 is hinged by cross pin 70 to permit inward shifting thereof in response to actuation of piston 71, roller 80, mounted at the upper end of oscillating frame 15, being received against the cam means 16. Means generally indicated at 72 and 73 are provided to oscillate the frame 15. Auxiliary buffers 18, as well as controls 19, complete the basic outline of the buffing machine with it being understood that a detailed recitation of the structure of the above recited component parts is set forth in U.S. Patent No. 2,979,123, of which this application is a continuation-in-part.

Accordingly, a detailed description of the components 13, 14, 15 and 17 will not be undertaken since such construction is recited in detail in applicant's aforesaid patent.

The specific improvement herein being made relates to the improvement of varying the edge outline of the cam means 16 so as to, in effect, change the path of movement followed by the buffer 14 across the treaded tire.

Thus, and by using the concepts of this invention, tires of varying treaded features can be accurately buffed.

Figure 2:
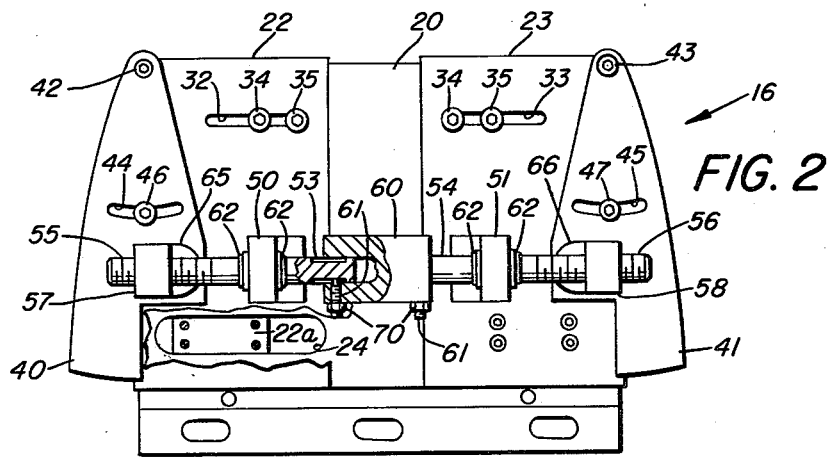
FIGURE 2 is a plan view of the improved cam.
Figure 3:
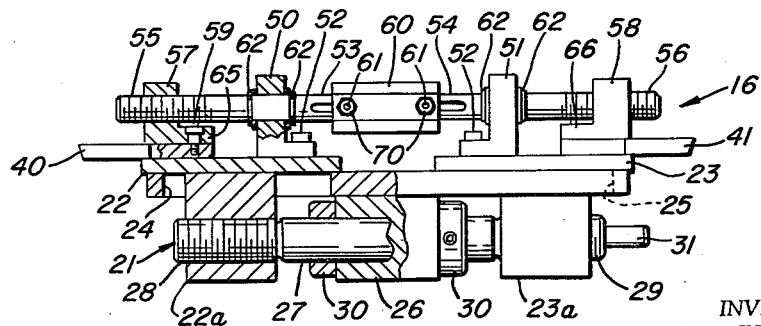
FIGURE 3 is a front view, partly broken away and in section, of the improved cam.

Referring now to FIGURES 2 and 3, the improved cam means 16, are shown including a base plate 20, that may be attached in known manner to the screw shaft 21, that is provided on the free end of the support 12, as best shown in FIGURE 1 of the drawing, with the entire cam mechanism 16 moving axially of screw shaft 21, as explained in the above referred to co-pending application.

Received on the base plate 20, in transversely shiftable relationship, therewith are cam plates 22 and 23, having depending bushings 22a, 23a, that are received through slots 24, 25, in base plate 20. In this manner, the threaded axial ends 28 and 29 of a shaft 27, can be received in these bushings 22a, 23a, with the shaft 27 being journalled in bushing 26, so that upon turning of end segment 31, the cam plates 22 and 23 will shift in unison across base plate 20, with collars 30, 30 locating shaft 27 against axial movement in bushing 26. Additionally slots 32 and 33 are provided on the cam plates 22 and 23 as best shown in FIGURE 2 for the purpose of locking these plates in position on base plate 20, after adjustment as by turning ends 31, with adjustment nuts 34, 35 being employed in each case to facilitate such adjustment.

Also, and as best shown in FIGURES 2 and 3 of the drawings, the cam plates 22 and 23 receive wing plates 40 and 41 that are pivotally secured thereto, as by bolts 42, and 43, with an arcuate path of movement for each wing plate being provided by use of arcuate slots 44 and 45, as well as stud bolts 46 and 47, that serve to lock the wing plates in the proper position once the same have been adjusted. To the end of adjusting the wing plates uniformly with regard to the base plate 20, each cam plate 22 and 23, further includes upright boss members 50 and 51, that are secured, as by bolts 52, 52, to the cam plates 20 and 21. Receivable through appropriate apertures provided in the boss members 50 and 51 are shaft members 53, 54 that have threaded axial end segments 55 and 56 respectively; the arrangement being such that the threaded segments 55 and 56 are received within boss members 57 and 58 respectively, with these boss members 57 and 58 being respectively secured to wing plates 40 and 41 by bolts 59, 59.

As indicated in FIGURES 2 and 3 of the drawings, the shaft members 53 and 54 connect with a coupling unit 60 that is preferably octagonal in external configuration so as to facilitate turning thereof by a wrench, with bolts 61, 61 facilitating such interconnection between shafts 53, 54 and coupling 60. Similarly, thrust washers 62, 62 serve to obviate axial movement between the shafts 53 and 54 and the respective boss members 50 and 51 within which the same are received, while the individual wing plates 40 and 41 are provided with members 65 and 66 that respectively connect with the boss members 57 and 58 by the usual bolts (see FIGURE 3).

In use or operation of the improved cam device, it will be first assumed that the same has been installed on a buffing machine of the type shown in FIGURE 1 of the drawings and in this regard, it will further be assumed that the parts are positioned for co-action together as clearly shown in FIGURE 1. At this time, if it is desired to change the course through which the oscillating buffer 14 will move, it is clearly seen that one or two independent settings can be made dependent upon the contour required. First, if it is desired to increase the width of the buffed area in the crown region, the end 31 can be rotated in the proper direction so as to spread the cam plates 22 and 23 apart, with such turning serving to shift these cam plates 22 and 23 tranversely of the base plate 20. Following this adjustment, the lock nuts 35, 35 may be tightened with the result that the cam plates 20 and 21 will be firmly fixed with respect to the base plate 20.

In the event that a second adjustment is required with respect to the direction of buffing movement in the sidewall regions of the tire, it is merely necessary that the nuts 46 and 47 be loosened, at which time the coupling 60 may be rotated to spread the wing plates 40 and 41 as by moving the same around their pivot points as the same are defined by the nuts 42, 42. After adjustment to the proper contour, the nuts 46 and 47 may be retightened and the appropriate contour will have been achieved. An axially locked nut in the form of set screw 70 may be additionally utilized if desired.

At this time, it is believed apparent that the roller 80 will move around the wing plates 40 and across the front of the cam plates 22 and 23 and then move around the opposed wing plate 41 with reversal of contact between these points being achieved upon reverse of the oscillation cycle.

When the tire has been buffed to the satisfactory depth of penetration, the tire may be removed from the support stand 13 as described in the above referred to co-pending application, at which time a new tire may be placed thereon. At this point, if it is desired to change the contour of buffing, it is merely necessary that either or both the positions of the wing plates or cam plates be changed as by moving the coupling 60 or the shaft 31, as has been previously described.

It will be seen from the foregoing that there has been provided a new and novel type of split cam designed for use with an oscillating type of buffing machine. It has been shown how the new and novel split cam is capable of being adjusted to obtain any desired contour representative of the path of preferred movement of the buffing wheel. Thus, with use of the improved split cam, the width of tread removed can be varied, and similarly, the contour of buffing in the sidewall region can be varied to suit the particular tire under consideration.

While the preferred embodiment of the invention has illustrated the use of wing plates in the sidewall region of the guide template, it is also to be understood that additional wing plates could be provided in the front or leading edge of the cam plate, by merely providing additional wing plates in this region. Thus, the invention is not to be restricted to the use of a single pair of auxiliary wing plates, it being fully intended that additional wing plates be provided where necessary or advisable.

While a full and complete disclosure of the invention has been made in accordance with the dictates of the patent statutes, it is to be understood that the invention is not intended to be limited to the preferred embodiment illustrated above.

Accordingly, modifications of the invention may be resorted to without departing from the spirit hereof, or the scope of the appended claims.

This application is a continuation-in-part of co-pending application Serial No. 620,411, filed November 5, 1956, by Adolf Frohlich and Edward J. Harris, and now U.S. Patent No. 2,979,123.

What is claimed is:

1. An adjustable cam device comprising; a base plate having an elongate edge surface; first and second cam plates carried by said base plate on opposite sides of the central portion of said surface; means for moving said cam plates relatively of each other in a common plane and relatively of said base plate in substantial parallelism therewith; wing plates respectively carried by said cam plates adjacent the edge portions thereof; and means for moving said wing plates relatively of said camming plates in unison with each other.

2. A tire buffing machine of the character described, comprising; a frame; support means for rotatably supporting a pneumtaic tire with respect to said frame; buffing means carried by said frame and being engageable with a tire supported on said support means; means for oscillating said buffing means along an arcuate path transverse to the tire tread; shifting means for positively shifting said frame towards and from said support means; cam means carried by said support means and having a camming edge surface engaged by said frame during shifting thereof; means for shifting said cam means relatively of said support whereby the depth of penetration by said buffing means may be varied; and adjustment means carried by said cam means and varying the length of said camming edge surface, whereby the path of movement of said buffing means transversely of said tread may be varied; said cam means include a base plate having an edge surface that forms a portion of said camming edge surface of said cam means; and a pair of side plates disposed on opposed sides of the center of said edge surface of said base plate and having edge surfaces that coact with said edge surface of said base plate to define an additional portion of said camming edge surface; said adjustment means moving said side plates in unison with respect to the center of said base plate.

3. The device of claim 2 further characterized by the presence of wing plates pivoted to said side plates; said wing plates being adjustable in unison with respect to said base plate.

References Cited in the file of this patent

UNITED STATES PATENTS

| | | |
|---|---|---|
| 975,589 | Watkins | Nov. 15, 1910 |
| 1,785,736 | Hess | Dec. 23, 1930 |
| 2,216,318 | Lewis | Oct. 1, 1940 |
| 2,788,851 | Rawls et al. | Apr. 16, 1957 |